(12) United States Patent
Stuermer

(10) Patent No.: US 6,965,856 B1
(45) Date of Patent: Nov. 15, 2005

(54) PROCESS FOR THE AUTOMATIC GENERATION OF A TEXTUAL EXPRESSION FROM A SEMANTIC REPRESENTATION USING A COMPUTER SYSTEM

(75) Inventor: Thomas Stuermer, Saarbruecken (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/343,929

(22) Filed: Jun. 30, 1999

(30) Foreign Application Priority Data

Oct. 29, 1998 (DE) .............................. 198 49 855

(51) Int. Cl.[7] .............................................. G06F 17/20
(52) U.S. Cl. .................. 704/1; 704/9; 704/10; 704/255
(58) Field of Search ............................ 704/1, 9, 10, 258, 704/260, 255

(56) References Cited

U.S. PATENT DOCUMENTS 5,369,574 A * 11/1994 Masegi et al. ................. 704/9
5,477,451 A * 12/1995 Brown et al. ................... 704/9
5,679,001 A * 10/1997 Russell et al. ............... 434/185
5,806,032 A *  9/1998 Sproat .......................... 704/255
5,870,701 A *  2/1999 Wachtel ......................... 704/9
6,246,981 B1 *  6/2001 Papineni et al. ............. 704/235

* cited by examiner

*Primary Examiner*—David D. Knepper
*Assistant Examiner*—Qi Han
(74) *Attorney, Agent, or Firm*—Owen J. Gamon

(57) ABSTRACT

A procedure for the automatic generation of a textual expression from a semantic representation by a computer-system is described. With the procedure, a statistical model is determined by the computer-system on a plurality of pre-determined pairs of semantic representations and associated expressions and stored. A semantic representation, from which an associated expression is determined by the computer system by means of the statistical model, is presented to the computer system. These steps are repeated by the computer system for further semantic representations if necessary.

12 Claims, 2 Drawing Sheets

PROCESS FOR THE AUTOMATIC GENERATION OF A TEXTUAL EXPRESSION FROM A SEMANTIC REPRESENTATION USING A COMPUTER SYSTEM

FIELD

The invention relates to a process for the automatic generation of a textual expression from a semantic representation using a computer system.

BACKGROUND

With an ever-increasing number of applications of a computer system it is advantageous or even necessary to communicate certain contents to the user. In the case of a timetable-information-system for example the computer-system should be able to show the desired timetable-information as text to the user. The text should contain not only the departure times, for example, but should provide the user with all essential information in the form of complete sentences or other textual expressions. This information can be shown on a screen in writing or can be output acoustically by way of a corresponding natural language output over a loudspeaker.

The production of text, especially the generation of sentences through a computer system is known.

Thus it is possible, that certain whole sentences are stored in a memory of the computer system, so that they can be called up again by individual programs and displayed. For example the sentence "File not found." can be stored and called up again at the appropriate time. Such procedures for the generation of sentences are also known as "canned text systems". This procedure is obviously not useable for a large number of sentences or for generating a variable sentence.

It is also possible, that only part of a certain sentence, which is variably completed on its retrieval from the computer system, is stored in the memory. For example, the sentence "the desired telephone number is - . . . " can be stored in the memory of the computer-system. On its retrieval, the computer system can add in the relevant telephone number and can output the complete sentence to the user. Such a system for the sentence generation is also known as a "template system". While it undoubtedly allows a certain variable sentence generation, it is nevertheless still very restricted in its flexibility.

Finally it is possible, with help of knowledge-based linguistic systems, to generate diverse sentences variably through a computer system. With it, so-called semantic representations which, for example, contain the information to be given to the user are determined by the computer system in a non-sentence-bound and non-grammatical format. This must be changed by the computer system into textual expressions or complete sentences. Such systems for the generation of textual expressions from semantic representations necessitate a substantial expenditure in storage area, computing time and development activity, so that they have so far only been available for certain, narrowly restricted generation tasks.

SUMMARY

It is the object of the invention to provide a procedure for the automatic generation of a textual expression from a semantic representation through a computer system, which can be employed for as large a number of semantic representations as possible and as flexibly as possible, which nevertheless necessitates only a justifiable expenditure in memory and computing time.

This object is achieved by the invention by a procedure for the automatic generation of an expression from a semantic representation in accordance with claim 1.

The invention uses a statistical model for the investigation of an expression from a semantic representation. The determined expression is here the most likely expression, which can be assigned to a pre-determined semantic representation on the basis of the statistical model.

This allows the advantages of the known "canned text systems", especially their fast accessibility, to be largely retained. Simultaneously, however, the number of expressions available becomes virtually unlimited.

The development of program code for the generating steps is widely separated from the statistical model and its development. In this way, the expansion of the procedure and its adaptation where necessary is essentially facilitated.

A change, for example, from the German to the English language can be achieved by an exchange of the German language by an English language translation within the statistical model alone, which means a considerable reduction in development costs.

For the determination of the statistical model, known, existing procedures or programs can be used, which also leads to a reduced expenditure in the development of the whole procedure.

Also it is possible that, for semantic representations not contained in the statistical model, at least useable textual expressions are generated. Consequently, the procedure is also suitable for the processing of new semantic representations.

In addition, the procedure in accordance with the invention exhibits no especially high storage area requirement and is also not critical in respect of its computing time for generation. Consequently, it does not possess the disadvantages of knowledge-based linguistic systems.

Through the conversion of the semantic representations and the associated expressions into an internal format, it is possible to simplify the corpus and the statistical model deriving from it. In particular, it further decreases the amount of memory required. Also irrelevant information can be filtered out for the statistical processing. The model is thus improved and computing is accelerated.

Through the introduction of generalizations, it is possible to widen the number of the expressions available practically indefinitely, without thereby significantly increasing the demands on memory and computing time. Conversely, a corpus becomes more compact by the summarizing of equivalent entries and the statistical model to be calculated more robust and more accurate.

BRIEF DESCRIPTION OF THE DRAWINGS

Further characteristics, uses and advantages of the invention result from the following description of examples of embodiments of the invention, which are shown in figures of the drawing. Here, all features described or represented alone or in any combination, form the subject matter of the invention, independent of their summary in the patent claims or their reference back and independent of their formulation or representation in the description or in the drawing.

DETAILED DESCRIPTION

Figure 1:
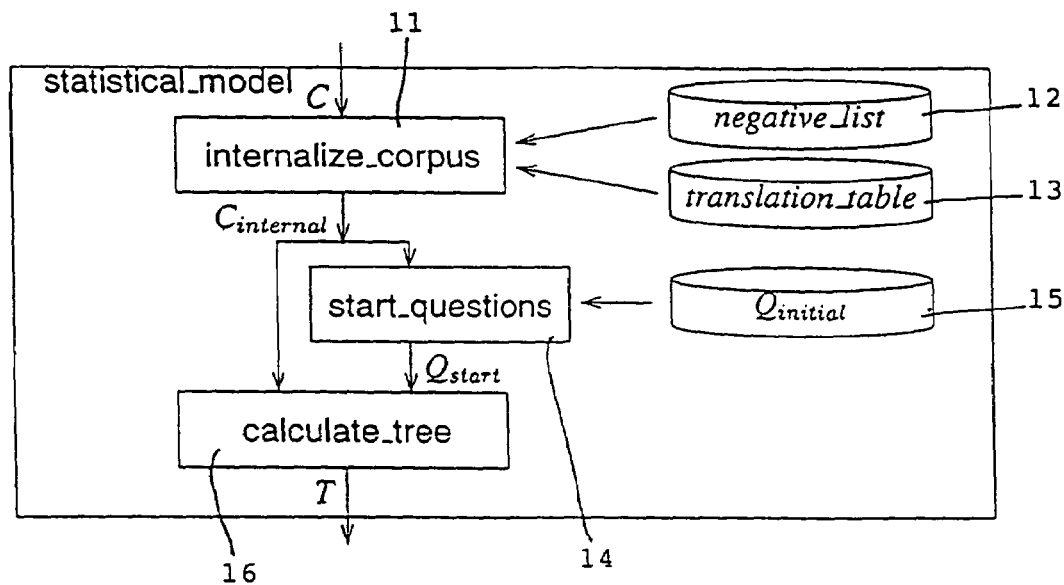
FIG. 1 shows a diagrammatic representation of a method for the investigation of a statistical model.
Figure 2:
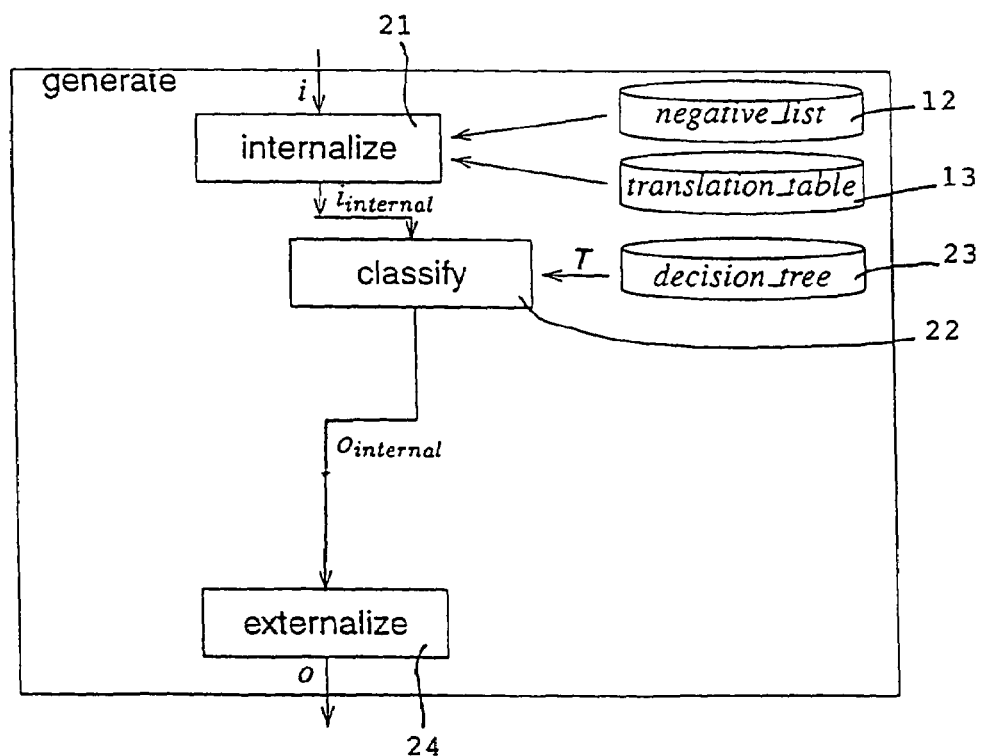
FIG. 2 shows a diagrammatic representation of a method for the generation of expressions on the basis of the statistical model of FIG. 1.

The starting point for the procedure for the calculation of a statistical model in accordance with FIG. 1, and also for the generation of expressions in accordance with FIG. 2, are pairs of semantic representations and associated expressions. From a multiplicity of such pairs a statistical model is determined in a preparatory step—the procedure in accordance with FIG. 1—, which subsequently—in the procedure in accordance with FIG. 2—is searched again for the purpose of generating sentences.

The manner of representing semantic representations and associated expressions is pre-determined and is marked as external. This external method of showing the pairs of semantic representations and associated expressions can, for example, be shown as follows:

Semantic representation, external mode of representation:
   from__until(15,14),
   def(17,i2,11,ht190),
   mofy(13,i1,apr),
   dofm(14, i2,i1,27),
   dofm(15,i2,i3,23) . . .
associated expression, external mode of representation:
"from the 23rd to the 27th of April"

It is possible, that this external mode of representation is produced independently by other programs of the computer-system. Also it is possible, that this or any other mode of representation results from the application of other programs of the computer-system. For example the mode of representation can itself be given by the application of a translation program or a speech-recognition program or the like which already uses the corresponding external mode of representation.

In the external mode of representation a multiplicity of pairs of semantic representations and of associated expressions are entered into the computer system and there stored in memory.

The pairs of semantic representations and associated expressions can either be input into the computer-system manually. In this case, a person can input into the computer system just those semantic representations and associated expressions, which are meaningful or necessary for the relevant application. It is also possible, that the pairs of semantic representations and associated expressions from another program, for example from the translation program or the speech-recognition program are converted and stored in the computer-system.

All pairs of semantic representations and associated expressions input into the computer system represent a corpus. The more extensive this corpus is, the more extensive also are the possibilities of a later generation of expressions through the computer system.

Starting with this corpus the computer system determines a statistical model in accordance with the procedure of FIG. 1.

For this, the corpus is first converted in a step 11 from the external mode of representation into an internal format. The pairs C are thus represented in pairs of Cinternal. To carry out this step, a negative list 12 and a translation table 13 are used. The internal format represents a simplification of the external mode of representation of the corpus, which is directed towards the determination of a statistical model to be carried out or is restricted to this.

The negative list describes information, which may be contained in the external representation, but which is irrelevant or even damaging for the statistical model. This information is not found in the internal representation. The translation table produces the reference from parts of the external representation to parts of the internal representation.

For example, the initially mentioned pair of a semantic representation and the associated expression are converted from the external mode of representation into the internal format as follows:

Semantic representation, internal format:
from__until,def,i1,i2,i3, 11, . . . ,17,
dofm(27th,23rd),mofy(April)
associated expression, internal format:
from,the,23rd,to,the,27th,of,April The corpus only existing in the internal format forms the basis for the determination of a statistical model. For this in a step 14 a number of questions Qstart were determined by the computer-system, with which the single entries of the corpus can be classified. In addition it is possible, that a number of initialising questions 15 can also be pre-determined manually.

From these questions, the computer system in a step 16 calculates on the basis of known procedures a statistical model to the existing corpus. With this, questions are generated for each component of the existing semantic representations of the computer-system, so that the relevant components are classified. This way the computer system produces a statistical decision-tree model T, for example.

Regarding the production of these questions, pre-determined boundary conditions can play a role, for example, that the decision-tree-model produced should preferably be properly balanced or the like.

The model T calculated in the step 16 is stored in the computer system. The investigation of this model T, and hence the procedure in accordance with FIG. 1, is gone through once, in fact before the actual generation of expressions in accordance with the procedure of FIG. 2. The last-named procedure then takes place on the basis of the calculated model T.

In the procedure in accordance with FIG. 1—pairs C of semantic representations and their associated expressions are therefore converted from the external mode of representation into the internal format, in order that the statistical model T can then be determined from the pairs Cinternal. These steps are carried out automatically by the computer system.

On the basis of the statistical model T the computer system can generate expressions in accordance with the procedure of FIG. 2.

For this, a semantic representation is supplied to the computer system as input i. This is converted in a step 21 first again from the external mode of representation into the internal format. For this the negative list 12 and the translation table 13 are again used. After the step 21 the semantic representation is consequently available as input iinternal.

In a step 22 the statistical model T is searched. This is, for example, —as already explained—stored in the computer system as decision-tree model 23. The above-mentioned questions are consequently put to the semantic representation converted into the internal format and will be followed, for example, in parallel, by a certain number of alternative answers, which possess the highest likelihood on the basis of model T and input i.

In this way a statistical search in the decision-tree model is carried out by the computer system, by which the most suitable expression for the pre-determined semantic representation is determined. This expression represents an output ointernal, which is still in the internal format.

In a step 24 the internal format of the output ointernal is again re-converted to the external representation mode, so that the expression produced is henceforth available as output o in the external representation mode.

Thus, the input i is converted to the internal format with the procedure in accordance with FIG. 2. Then the input iinternal is classified on the basis of the statistical model, in order to determine the most suitable output ointernal. This is finally re-converted to the external representation in output o. These steps are carried out automatically by the computer system.

It is possible, if necessary, after the determination of the most suitable expression, for the correctness of this expression to be checked again by the computer system with help of additional procedures.

The procedure in accordance with FIG. 2 and if necessary the named additional procedures is gone through for each input i, so that for each input i, and hence for each semantic representation, an associated output 0, and hence an associated expression, is generated by the computer-system.

To increase the capability of the above-described procedures it is possible to generalise the corpus consisting of pairs of semantic representations and associated expressions.

For this purpose, certain parts of associated semantic representations and the associated expressions, which can be generalised and which appear repeatedly, are generalised by the use of so-called patterns and templates. So, for example, a specific month is no longer adopted into the corpus as such but as a generalised month. In the generation of expressions, the assignment of the generalised month is stored to the specific month in the computer system beforehand and then subsequently re-introduced into the expression produced.

By way of example, a generalisation of the semantic representations and the associated expressions can be carried out as follows:

| Semantic representations: | associated expressions: |
|---|---|
| external representation mode: | |
| mofy(13,i1,apr), | "From the 23rd to |
| dofm(14,i2,i1,27), | the 27th of April" |
| dofm(16,i2,i3,23), | |
| internal format: | |
| from_until,def,i1,i2,i3, | from,the,23rd,to, |
| 11, . . . ,17, | the,27th,of,April |
| dofm(27th,23rd), | |
| mofy(April) | |
| generalised format: | |
| from_until,def,i1,i2,i3, | from,the,Vdofm2,to |
| 11, . . . ,17, | the,vdofm2,of,Vmofy1 |
| dofm(Vdofm1,Vdofm2) | |
| mofy(Vmofy1) | |

In the generalised format, the specific month "April", for example, is replaced by the generalised month "Vmofy1". The corpus therefore no longer contains the specific month "April" but only the generalised month "Vmofy1". The same applies to the specific month "June", for example, which is also represented in the corpus by the same generalised month "Vmofy1". Through the generalisation, the specific months of the year "January, February, . . . , December" are thus in this case replaced by the generalised month, "Vmofy1".

Figure 3:
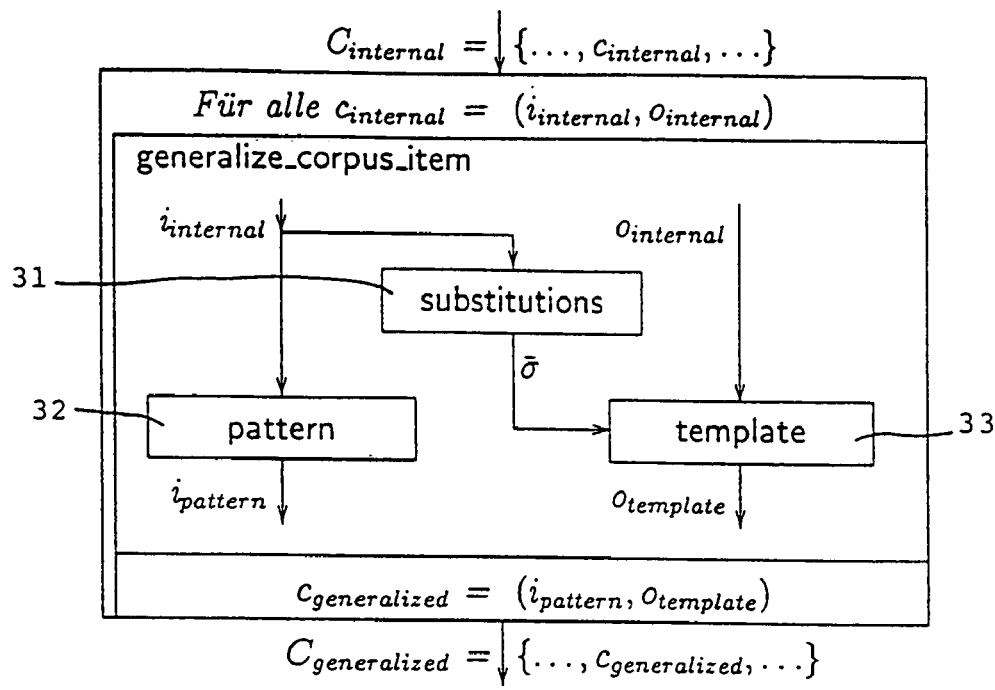
FIG. 3 shows a diagrammatic representation of a method for the generalization of a corpus, from which a generalized statistical model in accordance with FIG. 1 is determined.

Starting from the pairs Cinternal of semantic representations and associated expressions present in the internal format, the computer-system then determines in accordance with FIG. 3 pairs Cgeneralised, that are available in a generalised format. This generalisation is carried out for all individual pairs cinternal, which in each case are converted to pairs cgeneralised.

Each pair of the corpus is checked by the computer system for possible substitutions using the procedure in accordance with FIG. 3. The substitutions can be supplied manually or may also be determined automatically by the computer system if necessary. The substitutions are stored in the memory of the computer system. In FIG. 3 the substitutions are marked with the reference number 31.

On the basis of these substitutions 31 the semantic representation iinternal of a specific pair cinternal present in the internal format is converted in a step 32 into a semantic representation present in the generalised format ipattern. In a corresponding manner, the associated expression ointernal present in the internal format of the specific pair cinternal is converted in a step 33 into an expression otemplate present in the generalised format. In general, for each pair cinternal present in the internal format a pair cgeneralised present in the generalised format is produced, consisting of the respective semantic representation ipattern and the associated expression otemplate, each in the generalised format.

Subsequently, a generalised statistical model T' is produced from the pairs Cgeneralised by the computer system in the same manner, as has already been explained in connection with the procedure in accordance with FIG. 1. The decision-tree model produced differs from that of FIG. 1 mainly in that it contains the stored substitutions 31, which thus contains their substitute "Vmofy1" instead of the specific months "April" or "June" or the like.

Figure 4:
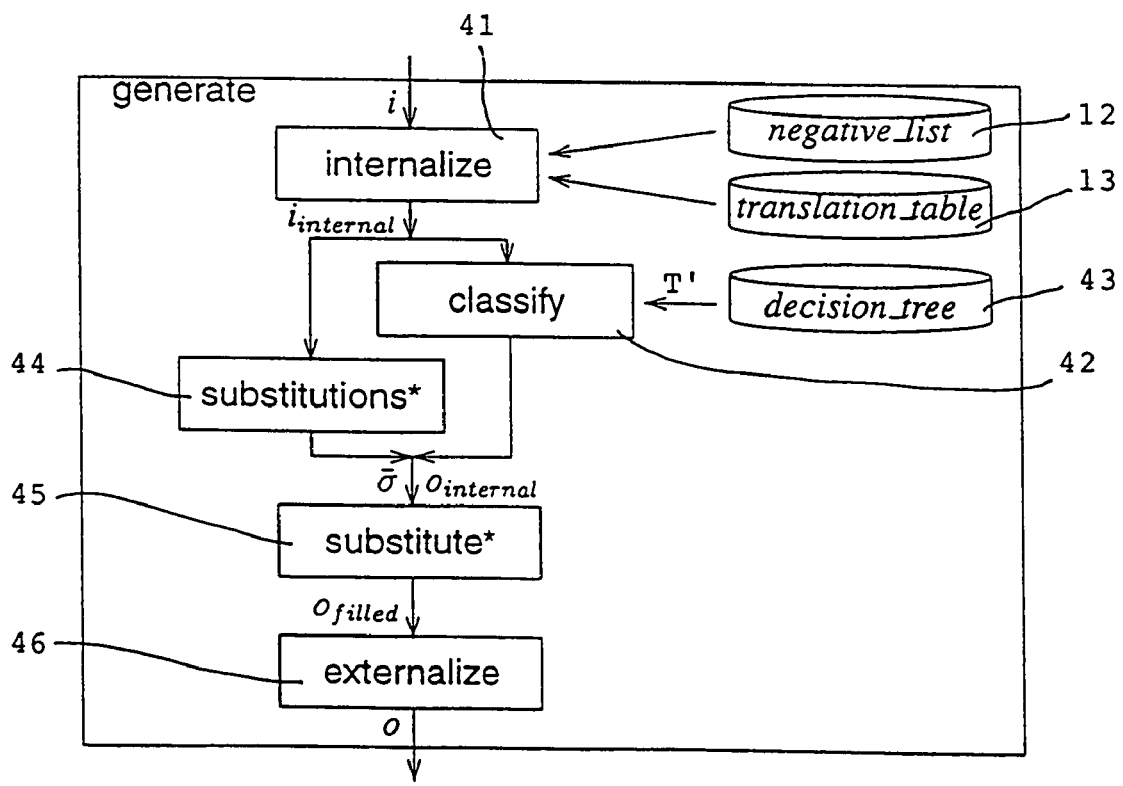
FIG. 4 shows a diagrammatic representation of a method for the generation of expressions on the basis of the generalised statistical model of FIG. 3.

On the basis of the generalised statistical model T' the computer-system can generate expressions in accordance with the procedure of FIG. 4.

To do this, a semantic representation is supplied to the computer system as input i. This is first converted again in a step 41 from the external representation mode into the internal format. For this, the negative list 12 and the translation table 13 are again used. After the step 41, the semantic representation is thus available as input iinternal.

In a step 42, the generalised statistical model T' is searched. This is stored in the computer-system as the decision-tree model 43. This way a statistical search in the decision-tree model is carried out by the computer system, which determines the most suitable expression for the pre-determined semantic representation. This expression may—because of the generalisations underlying the statistical model T—contain substitutions.

In a step 44 the computer system, at approximately the same time as step 42, stores in its memory the substitutions actually occurring in the semantic representations iinternal with their respective specific content.

The temporary expressions produced in step 43 and the substitutions stored in step 44 are revised in a step 45 in such a way that the existing substitutions are again replaced. Thus the stored content is now put into the temporary expression again instead of the substitution, so that the final expression corresponds to the initial semantic representation. This expression represents an output ofilled, that is still in the internal format.

In a step 46 the internal format of the output ofilled is re-converted into the external representation mode again, so that the expression produced is now available as output o in the external representation mode.

What is claimed is:

1. A method for the automatic generation of a textual expression from a semantic representation, comprising the computer-executed steps of:

building a statistical model from a plurality of pre-determined pairs of semantic representations and associated expressions, wherein the building further comprises determining which information in an external format is present in a negative list and which information in the external format is absent in the negative list, wherein the negative list describes information in the external format that is irrelevant to the statistical model, wherein the statistical model comprises a decision tree; and producing a first associated expression from a first semantic representation using the statistical model.

2. The method of claim 1, wherein the building step farther comprises:

converting the pairs of semantic representations and associated expressions from the external format into an internal format.

3. The method of claim 2, wherein the converting step further uses the negative list and a translation table.

4. The method of claim 3, wherein the converting step further comprises:

converting information that is absent in the negative list from the external format to the internal format using the translation table; and refraining from converting information that is present in the negative list.

5. The method of claim 2, wherein the building step further comprises:

determining a plurality of questions;

classifying the information in the internal format using the plurality of questions; and calculating the statistical model from the internal format using the plurality of questions.

6. The method of claim 5, wherein the determining step further comprises:

determining the plurality of questions from pre-determined boundary conditions.

7. An apparatus for the automatic generation of a textual expression from a semantic representation, comprising:

means for building a statistical model from a plurality of pre-determined pairs of semantic representations and associated expressions, wherein the building further comprises determining which information in an external format is present in a negative list and which information in the external format is absent in the negative list, wherein the negative list describes information in the external format that is damaging to the statistical model, wherein the statistical model comprises a decision tree; and means for producing a first associated expression from a first semantic representation using the statistical model.

8. The apparatus of claim 7, wherein the means for building further comprises:

means for converting the pairs of semantic representations and associated expressions from the external format into an internal format.

9. The apparatus of claim 8, wherein the means for converting further uses the negative list and a translation table.

10. The apparatus of claim 9, wherein the means for converting further comprises:

means for converting information that is absent in the negative list from the external format to the internal format using the translation table; and means for refraining from converting information that is present in the negative list.

11. The apparatus of claim 8, wherein the means for building further comprises:

means for determining a plurality of questions;

means for classifying the information in the internal format using the plurality of questions; and means for calculating the statistical model from the internal format using the plurality of questions.

12. The apparatus of claim 11, wherein the means for determining further comprises:

means for determining the plurality of questions from predetermined boundary conditions.

* * * * *